United States Patent
Dobbs et al.

[11] Patent Number: 6,083,463
[45] Date of Patent: Jul. 4, 2000

[54] FOOD PROCESS CHILLER TANK WITH DISINFECTION SYSTEM

[75] Inventors: M. Bruce Dobbs, Albuquerque, N. Mex.; Gary M. Nolen; Michael F. Wahl, both of Richland, Wash.; Amy Waldroup, Springdale, Ark.

[73] Assignee: Los Alamos Technical Associates, Inc

[21] Appl. No.: 08/901,867

[22] Filed: Jul. 29, 1997

[51] Int. Cl.$^7$ .............................. C02F 1/76; A22C 21/00
[52] U.S. Cl. ..................... 422/105; 422/3; 422/37; 422/62; 422/119; 210/198.1; 210/754; 210/743; 99/517; 452/173
[58] Field of Search ................. 422/28, 37, 41, 422/62, 81, 105, 119, 3; 210/198.1, 754, 756, 739, 743, 746; 426/332, 524; 99/517, 536; 452/173

[56] References Cited

U.S. PATENT DOCUMENTS

| | | | |
|---|---|---|---|
| 3,706,532 | 12/1972 | Noll | 422/3 X |
| 3,724,474 | 4/1973 | Devale . | |
| 4,056,470 | 11/1977 | Carpenter | 422/110 X |
| 4,790,943 | 12/1988 | Dunn et al. . | |
| 4,801,886 | 1/1989 | Steininger . | |
| 5,173,190 | 12/1992 | Picek . | |

OTHER PUBLICATIONS

Block, Seymour S. Disinfection, Sterilization, and Preservation, p. 721, 1991.

*Primary Examiner*—Elizabeth McKane
*Attorney, Agent, or Firm*—Calvin B. Ward

[57] ABSTRACT

A water system for supplying chilled water to a food production line. The chilled water is held in a holding tank which is sampled by a pump which delivers water to an analyzer. The water is first filtered to remove debris that would hamper the analysis. The analyzer determines the disinfectant level in the water, and generates a signal indicative of that level. When the disinfectant level falls below a predetermined level, a disinfection pump is activated to deliver additional disinfectant to the tank. The preferred disinfectant is Liquid Chlorine(sodium hypochlorite). The analyzer can measure the free available chlorine level, pH or oxidation-reduction potential of the water.

6 Claims, 1 Drawing Sheet

FOOD PROCESS CHILLER TANK WITH DISINFECTION SYSTEM

FIELD OF THE INVENTION

The present invention relates to food processing, and more particularly, to a chiller tank system for use in the rapid refrigeration of food products.

BACKGROUND OF THE INVENTION

The recent outbreaks of bacterial based diseases arising from the ingestion of meat or poultry products have underscored the need to refrigerate these products as soon as possible in the processing and distribution process. One method for quickly chilling such products is to immerse the product in water at or near 0° C. The water used for this purpose is pumped from a refrigerated tank into an immersion tank containing the products to be chilled. The spent water from the immersion tank is returned to the refrigerated tank to be re-cooled.

While this arrangement reduces the time at which the food products remain at an elevated temperature, it introduces a new source of possible contamination, namely the water from the refrigerated tank. The water collects micro-organisms from the food products. This contamination increases with time. To prevent contamination of the food products subsequently treated, some form of sterilization system is needed to assure that any micro-organisms that enter the water stream are killed.

One method for sterilizing the chiller water is to introduce a sterilizing agent such as chlorine gas or mixed oxidants of the type described in U.S. Pat. No. 5,316,740 into the water. However, the concentration of such agents must be maintained within strict limits. If too much of the agent is added, the taste of the food products will be adversely affected. If too little agent is added, the biological contamination will not be destroyed.

Broadly, it is the object of the present invention to provide an improved chilled water system for rapidly cooling food stuffs.

It is a further object of the present invention to provide a chilled water system in which the concentration of a sterilizing agent can be controlled.

These and other objects of the present invention will become apparent to those skilled in the art from the following detailed description of the invention and the accompanying drawings.

SUMMARY OF THE INVENTION

The present invention is a water system for supplying chilled water to a food production line. The chilled water is held in a holding tank which is sampled by a pump which delivers water to an analyzer. The water is first filtered to remove debris that would hamper the analysis. The analyzer determines the disinfectant level in the water, and generates a signal indicative of that level. When the disinfectant levels falls below a predetermined level, a disinfection pump is activated to deliver additional disinfectant to the tank. The preferred disinfectant is liquid Chlorine (sodium hypochlorite). The analyzer can measure the free available (FAC) chlorine level, pH or oxidation-reduction potential of the water.

DETAILED DESCRIPTION OF THE INVENTION

Figure 1:
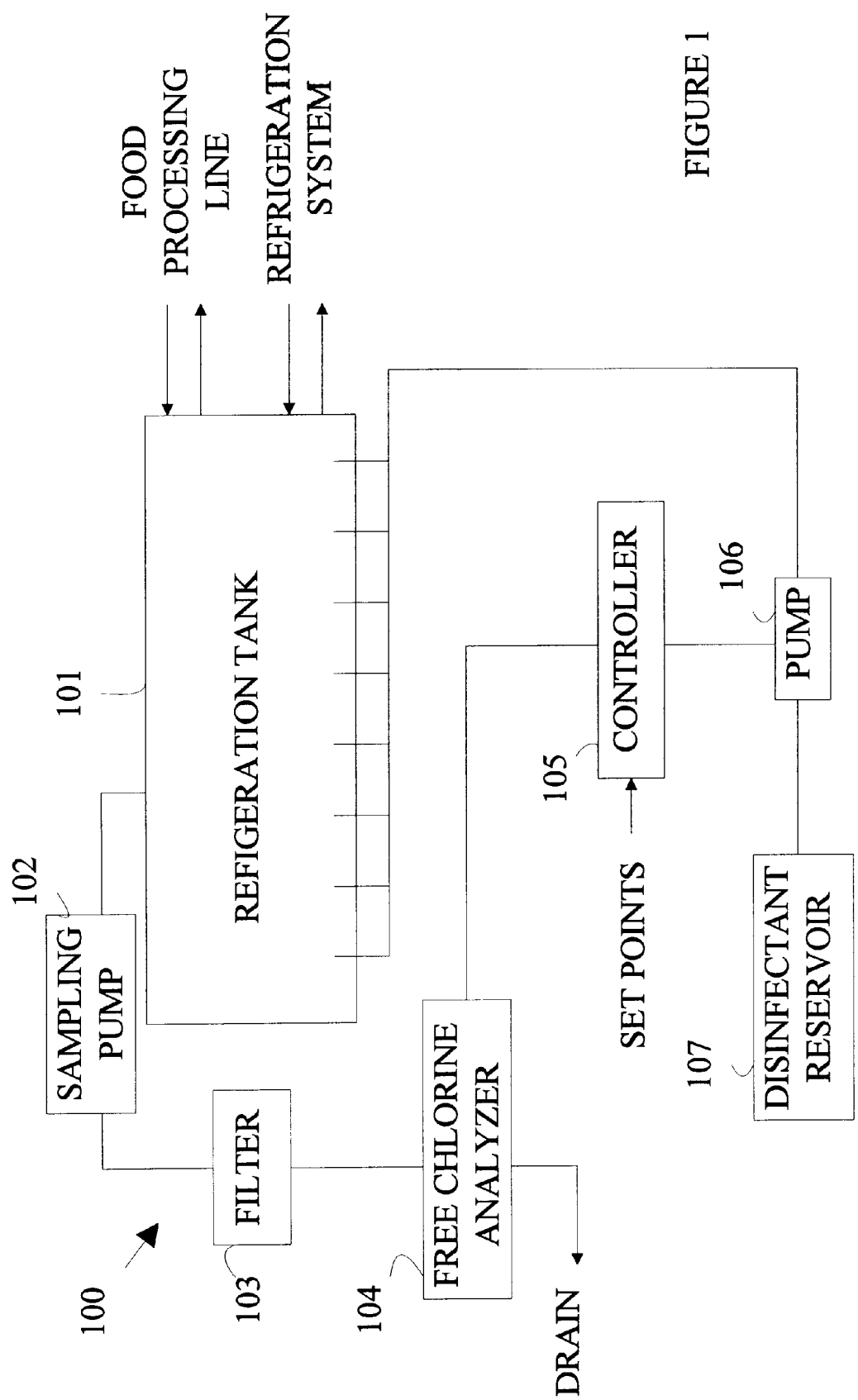
FIG. 1 is a block diagram of a chilled water system according to the present invention.

The manner in which the present invention achieves its goal may be more easily understood with reference to FIG. 1 which is a block diagram of a chiller system 100 according to the present invention. The water used on the food processing line is stored in a refrigeration tank 101 which is connected to a refrigeration system for maintaining the water temperature within a predetermined range of temperatures. Water from refrigeration tank 101 is removed for analysis by sampling pump 102 which delivers the water to a free-chlorine analyzer 104 after passing the water through a filter 103.

The filter preferably removes particulate matter that is larger than 100 microns in diameter. During food processing, it has been found experimentally that the water becomes contaminated with organic debris. This debris disables many types of analyzers. Filter 103 removes this debris.

The output of analyzer 104 is a signal indicative of the level of available oxidant in the water of tank 101. If this level falls below a predetermined set point, controller 105 activates pump 106 which delivers additional disinfectant to tank 101 from reservoir 107.

The above described embodiment of the present invention utilized a FAC analyzer to determine when additional disinfectant should be added to tank 101. However, other analyzers may be utilized for this purpose without departing from the teaching of the present invention. For example, pH or oxidation-reduction potential measurements may be used in place of free chlorine measurements.

In the preferred embodiment of the present invention, the disinfectant is chlorine gas. On site generation of chlorine gas avoids the safety problems normally associated with the transportation of chlorine. However, sodium hypochlorite or other disinfecting solutions may be utilized.

The pattern of injection into tank 101, in general, depends on the geometry of the tank and any mixing systems which are included in the tank. In general, a number of input nozzles are provided at the bottom of the tank as shown at 108. However, other arrangements may be utilized.

Various modifications to the present invention will become apparent to those skilled in the art from the foregoing description and accompanying drawings. Accordingly, the present invention is to be limited solely by the scope of the following claims.

What is claimed is:

1. A chilled water system comprising:
   a tank for holding water, said tank comprising a first port connecting said tank to a refrigeration system and a second port connecting said tank to a food processing line, said water being used to cool products on said food processing line by immersing said products in said water;
   a sampling pump for removing water from said tank and causing said water to flow through a sample filter;
   an analyzer for determining the disinfectant level in said water, said analyzer receiving water from said filter; and
   a disinfection pump, responsive to a signal from said analyzer that said disinfectant level is below a predetermined level, for pumping disinfectant into said tank;

wherein said sampling pump transfers water from said tank to said analyzer through said filter.

2. The water system of claim 1 wherein said analyzer determines the available free available chlorine in said water.

3. The water system of claim 1 wherein said analyzer determines the pH of said water.

4. The water system of claim 1 wherein said analyzer determines the oxidation-reduction potential of said water.

5. The water system of claim 1 wherein said disinfectant comprises Chlorine gas.

6. The water system of claim 1 wherein said disinfectant comprises hypochlorite.

* * * * *